United States Patent [19]

Spivack

[11] 4,049,654
[45] Sept. 20, 1977

[54] 2,3,5-TRIALKYLSUBSTITUTED HYDROXYBENZYL ISOCYANURATES

[75] Inventor: John D. Spivack, Spring Valley, N.Y.

[73] Assignee: Ciba-Geigy Corporation, Ardsley, N.Y.

[21] Appl. No.: 598,295

[22] Filed: July 23, 1975

Related U.S. Application Data

[63] Continuation of Ser. No. 400,604, Sept. 25, 1973, abandoned.

[51] Int. Cl.² .................................. C07D 251/34
[52] U.S. Cl. .......................... 544/221; 260/45.8 NT
[58] Field of Search ............................... 260/248 NS

[56] References Cited

U.S. PATENT DOCUMENTS

| | | | |
|---|---|---|---|
| 3,531,483 | 9/1970 | Gilles | 260/248 |
| 3,598,815 | 8/1971 | Gilles | 260/248 |
| 3,669,961 | 6/1972 | Gilles | 260/248 |
| 3,669,962 | 6/1972 | Smith et al. | 260/248 |
| 3,723,427 | 3/1973 | Susi | 260/248 |

Primary Examiner—John M. Ford
Attorney, Agent, or Firm—Nestor W. Shust

[57] ABSTRACT

The compounds are 2,3,5-trialkylsubstituted hydroxy benzyl isocyanurates having the formula

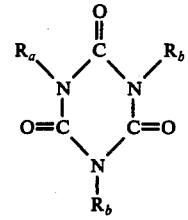

where $R_a$ is a 2,3,5-trialkylsubstituted hydroxybenzyl group of the formula II or hydrogen, and $R_b$ is a 2,3,5-trialkylsubstituted hydroxybenzyl group of formula II

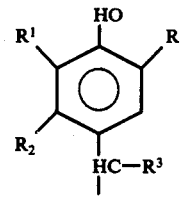

wherein $R^1$ and $R^2$ are alkyl or cycloalkyl groups, and $R^3$ is hydrogen or alkyl One method for making the compounds of this invention is by reacting a 2,3,6-trialkyl-4-(dimethylamino)-phenol with cyanuric acid.

The compounds are useful as stabilizers of organic materials, especially polyolefins, which deteriorate upon exposure to light and heat.

2 Claims, No Drawings

2,3,5-TRIALKYLSUBSTITUTED HYDROXYBENZYL ISOCYANURATES

This is a continuation of application Ser. No. 400,604 filed on Sept. 25, 1973 now abandoned.

This invention pertains to 2,3,5-trialkylsubstituted hydroxybenzyl isocyanurates and to organic materials normally subject to oxidative, thermal and UV light deterioration stabilized with said isocyanurates. More specifically, the compounds of this invention are those having the formula Ia -

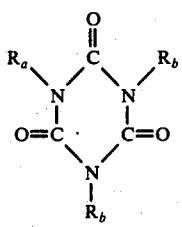
Ia wherein
$R_a$ is a 2,3,5-trialkylsubstituted hydroxybenzyl group of the formula II, or hydrogen, and
$R_b$ is a 2,3,5-trialkylsubstituted hydroxybenzyl group of formula II

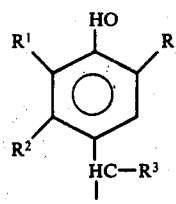

wherein
R, $R^1$ and $R^2$ are alkyl or cycloalkyl groups and $R^1$ and $R^2$ together with phenyl form a tetrahydronaphthyl group, and
$R^3$ is hydrogen or alkyl The R, $R^1$ and $R^2$ groups can be straight or branched lower alkyl groups having 1 to 8 carbon atoms as for example methyl, ethyl, propyl, butyl, pentyl, heptyl or octyl. Preferably R is a branched alkyl group such as isopropyl, sec-butyl tert-butyl, sec- and tert-pentyl, sec- and tert- hexyl sec- and tert-heptyl or sec- and tert-octyl and most preferably a tert-butyl group. $R^1$ and $R^2$ are preferably in alkyl group having 1 to 3 carbon atoms and most preferably, methyl group.

The compounds of this invention are made by reaction of 2,3,5-trialkylsubstituted hydroxybenzyl halides of the formula III below with cyanuric acid in the presence of alkali:

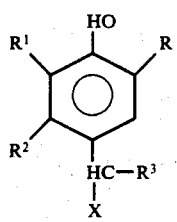
III

In formula III,
R, $R^1$, $R^2$ and $R^3$ are as defined in formula II, and X is Cl or Br Another method of preparing compounds of this invention is by trimerization of cyanates of formula IV

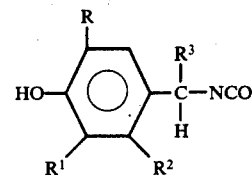
IV

A further method of preparing compounds of this invention is as represented by equation (1):

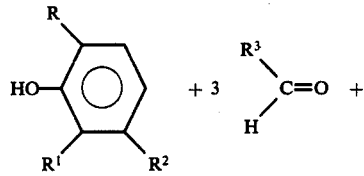

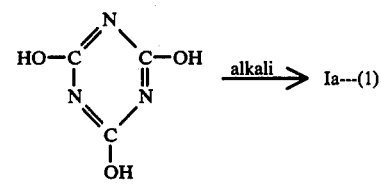

where R, $R^1$, $R^2$ and $R^3$ are as previously defined. A further method of synthesizing the stabilizers of formula Ia is by reacting cyanuric acid as represented by equation (2):

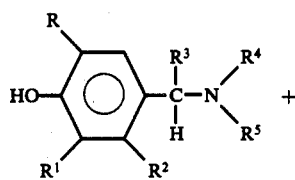

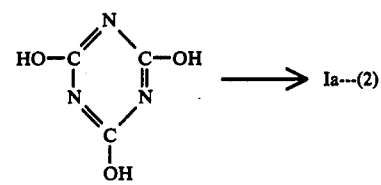

where, R, $R^1$, $R^2$ and $R^3$ are as previously defined, and $R^4$ and $R^5$ are lower alkyl, or where $R^4$ and $R^5$ together with the nitrogen atom form a heterocyclic ring and as morpholine.

When Rb is not hydrogen, a further method of preparing compounds of formula Ia is by hydroxybenzylating compounds of the formulas shown below by the reactants shown above in reaction with cyanuric acid.

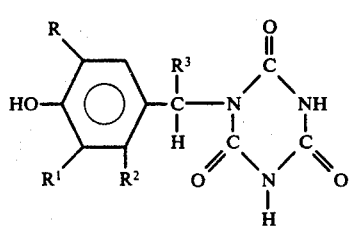

-continued

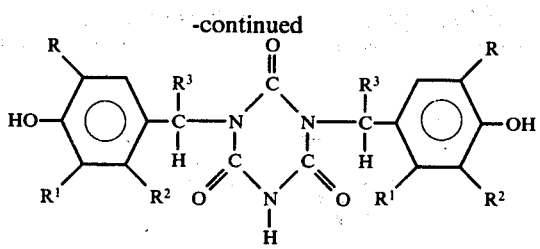

Most of the 2,3,6-trialkylated phenols contemplated for use as starting materials to make the compounds of this invention are all known compounds which are available commercially. If not available commercially, the synthesis of these starting phenols has been disclosed in the literature of their syntheses is shown in the examples. Thus, the preparation of for example, 2,6-diisopropyl-3-methyl phenol and 2,6-di-tert-butyl-3-methyl phenol is disclosed in Japanese patent No. 70 15,491. The preparation of 2,3-dimethyl-6-tert-butyl phenol is disclosed by G. Parc in Revue de L'-Institut Francais du Petrole Vol. XV, page 693 (1960).

The 2,3,5-trialkylsubstituted hydroxybenzyl isocyanurates of this invention not only have superior stabilizing properties but exhibit resistance to gas fading in polymeric substrates such as propylene multifilament knitted cloth. In addition, the stabilizers of this invention confer superior processing stability to polymers.

The 2,3,5-trialkylsubstituted hydroxybenzyl isocyanurates of this invention are stabilizers of organic material normally subject to thermal and oxidative deterioration. Materials which are thus stabilized include synthetic organic polymeric substances such as vinyl resins formed from the polymerization of vinyl halides or from the co-polymerization of vinyl halides with unsaturated polymerizable compounds, e.g., vinyl esters, $\alpha,\beta$-unsaturated ketones $\alpha,\beta$-unsaturated aldehydes and unsaturated hydrocarbons such as butadienes and styrene; poly-$\alpha$-olefins polybutylene including copolymers of $\alpha$-olefins such as ethylene-propylene copolymer; dienes such as polybutadiene, polyisoprene, and the like, including copolymers with other monomers; polyurethanes and polyamides such as polyhexamethylene adipamide and polycaprolactam; polyesters such as polyethylene terephthalates; polycarbonates; polyacetals; polystyrene, polyethyleneoxide; and copolymers such as those of high impact polystyrene containing copolymers of butadiene and styrene and those formed by the copolymerization of acrylonitrile, butadiene and/or styrene; natural and synthetic rubbers such as ethylene-propylene-diene copolymer (EPDM) and chlorinated rubber.

Other materials which can be stabilized by the compounds of the present invention include lubricating oil of the aliphatic ester type, i.e., di(2-ethylene)-azelate and other synthetic ester lubricants, pentaerythritol tetraceproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins and the like, salts of fatty acids such as soaps and the like; and alkylene glycols, e.g., $\beta$-methoxyethyleneglycol, methoxytriethyleneglycol, triethylene glycol, octaethyleneglycol, dibutyleneglycol, dipropyleneglycol and the like.

The substrates of particular importance are olefin polymers such as polyethylene and polypropylene. Propypropylene is especially well stabilized with the compounds of this invention.

In general, the stabilizers of this invention are employed from about 0.01 to about 5% by weight of the stabilized composition, although this will vary with the particular substrate and application. An advantageous range is from about 0.05 to about 2% and especially from about 0.01 to about 1%.

For addition to polymeric substrates, the stabilizers can be blended before polymerization or after polymerization, during the usual processing operations, for example, by hotmilling, the composition then being extruded, pressed, or the like into films, fibers, filaments, hollow spheres and the like. The heat stabilizing properties of these compounds advantageously stabilize the polymer against degradation during such processing at the high temperature generally encountered. The stabilizers can also be dissolved in suitable solvents and sprayed on the surface of films, fabrics, filaments or the like to provide effective stabilization.

These compounds can also be used in combination with other additives such as sulfur-containing esters, e.g., disteryl-$\beta$-thiodipropionate (DSTDP) in an amount of from 0.01 to 2% by weight of the organic material, as well as di- and tri-alkyl- and -alkylphenyl-phosphites, heat stabilizers and ultraviolet light stabilizers. Often, combinations such as these, particularly the sulfur containing esters, the phosphites and/or the ultraviolet light stabilizers will produce superior results in certain applications to those expected by the properties of the individual components.

The following formula represents co-stabilizers which are in certain instances very useful in combination with the stabilizers of this invention:

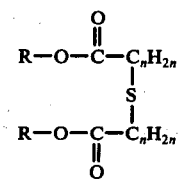

wherein R is an alkyl group having from 6 to 24 carbon atoms; and n is an integer from 1 to 6. Especially useful compounds of this type are dilauryl-$\beta$-thiodipropionate and distearyl-$\beta$-thiodipropionate. The above co-stabilizers are used in the amount of from 0.01 to 2% by weight of the organic material, and preferably from 0.1 to 1%.

The stabilizers of this invention may be used also to stabilize organic material in combination with other additive agents, such as e.g., antioxidants, antiozonants, pourpoint depressents, corrosion and rust inhibitors, dispersing agents, chelating agents, surface active agents, demulsifiers, anti-foaming agents, carbon black, accelerators, plasticizers, color stabilizers, heat stabilizers, ultra-violet absorbers, dyes and pigments fillers.

In addition to the above noted additives that can be employed in combination with the compounds of this invention, it is often especially advantageous to employ also light stabilizers. Illustrative examples of light stabilizers are listed below.

UV-Absorbers and light protection agents 2-(2'-hydroxyphenyl)-benzatriazoles, such as, for example, the 5'-methyl-, 3',5'-di-tert.-butyl-, 5'-tert.-butyl, 5'(1,1,3,3-tetramethyl-butyl)-,5-chloro-3',5'-di-tert.-butyl, 5-chloro-3'-tert.-butyl-5'-methyl-, 3'-sec.-butyl-5'-tert.-butyl, 3'-α-methyl-benzyl-5'-methyl-, 3'-α-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl or 5-chloro-3',5'-di-tert.-amyl-derivative.

2,4-bis-(2'-hydroxyphenyl)-6-alkyl-s-triazines, such as, for example, the 6-ethyl-, 6-undecyl- or 6-heptadecyl-derivative.

2-hydroxy-benzophenones, such as, for example, the 4-hydroxy-, 4-methoxy-, 4-octoxy-, 4-decyloxy, 4-dodecyloxy-, 4-benzyloxy-, 4,2',4'-trihydroxy- or 2'-hydroxy-4,4'-dimethoxy-derivative.

1,3-bis-(2'-hydroxy-benzoyl)-benzenes, such as, for example, 1,3-bis-(2'-hydroxy-4'-hexyloxy-benzoyl)benzene, 1,3-bis-(2'-hydroxy-4'-octoxy-benzoyl)-benzene and 1,3-bis-(a'-hydroxy-4'-dodecyloxy-benzoyl)-benzene.

Esters of optionally substituted benzoic acids, such as, for example, phenyl salicylate, octylphenyl salicylate, di-benzoylresorcinol, bis-(4-tert.-butylbenzoyl)-resorcinol, benzoyl-resorcinol, 3,5-di-tert.-butyl-4-hydroxybenzoic acid 2,4-di-tert.-butyl-phenyl ester, octadecyl ester of 2-methyl-4,6-di-tert.-butylphenyl ester.

Acrylates, such as for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester and N-(β-carbomethoxy-vinyl)-2-methyl-indoline.

Nickel compounds, such as, for example, nickel complexes of 2,2'-thio-bis-4-(1,1,3,3-tetramethylbutyl)-phenol such as the 1:1 and 1:2 complex, optionally with other ligands such as n-butylamine, triethanolamine or N-cyclohexyl-diethanolamine; nickel complexes of bis-{2-hydroxy-4-(1,1,3,3-tetramethylbutyl)-phenyl}-sulphone, such as the 2:1 complex, optionally with other ligands such as ethyl-caproic acid; nickel dibutyldithiocarbamate, nickel salts of 4-hydroxy-3,5-di-tert.-butyl-benzylphosphonic acid monoalkyl esters, such as the methyl, ethyl or butyl ester, the nickel complex of (2-hydroxy-4-methylphenyl)-undecyl-ketonoxime and nickel 3,5-di-tert.-butyl4-hydroxy-benzoate.

Oxalic acid diamides, such as, for example, 4,4'-di-octyloxyoxanilide, 2,2'-dioctyloxy-5,5'-di-tert.-butyloxanilide, 2,2'-di-dodecyloxy-5,5'-di-tert.-butyl oxanilide, 2-ethoxy-5-tertiarybutyl-2'-ethyl-oxanilide, 2-ethoxy-2'-ethyl-oxanilide, N,N'-bis-(3-dimethylaminopropyl) oxalamide, mixtures of o- and p-methoxy and o- and p-ethoxy-di-substituted oxanilies and mixtures of 2-ethoxy-5-tert.-butyl 2'-ethyl-oxanilide with 2-ethoxy-2'-ethyl-5,4'-di-tert.-butyl-oxanilide.

Sterically hindered amines, such as, for example 4-benzoyloxy-2,2,6,6-tetramethylpiperidine, 4-stearoyloxy 2,2,6,6-tetramethylpiperidine, bis-(2,2,6,6-tetramethylpiperidyl)-sebacate and 3-n-octyl-7,7,9,9-tetramethyl1,3-triaza-spiro{4,5}decane-2,4-dione.

For exemplification purposes only, listed below are compounds of this invention which are useful as stabilizers as discussed above.

2,4,6-tris(5-tert.-butyl-2,3-dimethyl-4-hydroxybenzyl-)isocyanurate 2,4,6-tris{[5-(1,1,3,3-tetramethylbutyl)-2,3-dimethyl4-hydroxybenzyl]}isocyanurate 2,4-bis{[5-(1,1,3,3-tetramethylbutyl)-2,3-dimethyl-4-hydroxybenzyl]} isocyanurate 2,4,6-tris-(2-tert.-butyl-4-hydroxy-5,6,7,8-tetrahydro-1-naphthylyl)isocyanurate 2,4,6-tris(2,3,5-trimethyl-4-hydroxybenzyl)isocyanurate 2,4,6-tris(5-tert.-butyl-2,3-dimethyl-4-hydroxybenzyl -α-methyl)isocyanurate 2,4,6-tris(2,3-dimethyl-4-hydroxy-5-isopropylbenzyl-)isocyanurate 2,4,6-tris(3,5-diisopropyl-4-hydroxy-2-ethylbenzyl) isocyanurate 2,4,6-tris(3,5-dicyclohexyl-4-hydroxy-2-methylbenzyl)isocyanurate 2,4,6-tris(3,5-dicyclopentyl-4-hydroxy-2-methylbenzyl)isocyanurate 2,4,6-tris(2,3,5-tri-n-octyl-4-hydroxybenzyl) isocyanurate The following examples are illustrative of the invention but are not meant to limit the scope of same. In said examples, parts are by weight unless otherwise indicated and the relationship between parts by weight and parts by volume is as that between grams and cubic centimeters. The temperatures are in degrees centigrade.

EXAMPLE 1

6-tert.-butyl-2,3-dimethyl-4-(dimethylaminomethyl)-phenol

To 142.4 grams of 6-tert.-butyl-2,3-dimethylphenol dissolved in 270 ml of toluene was added 144.4 grams of a 25% aqueous solution of dimethylamine at about room temperature. 65.7 grams of 36.5% aqueous formaldehyde was then added over a ten minute period to the reaction mixture initially at 15°, the temperature rising to 30° at the end of the addition. The reaction mixture was then warmed to 40° for 3 hours and finally heated at reflux (85°) for two hours. The reaction was diluted with about 1 liter of ether and the aqueous layer spearated, the upper ether layer being washed three times with water. After drying over sodium sulfate, the organic phase was stripped to dryness at reduced pressures yielding 176.3 grams of crude product. The crude product was crystallized from heptane, yielding while crystals melting at 101° to 104°.

EXAMPLE 2

6-tert.-octyl-2,3-dimethyl-4-(dimethylaminomethyl)-phenol

This compound was made in substantially the same manner as described in Example 1 by subsituting 6-tert.-octyl-2,3-dimethylphenol for the 6-tert.-butyl analog. After trituration from n-hexane, the desired product was obtained as white crystals melting at 130° to 132°.

EXAMPLE 3

2-tert.-butyl-4-(dimethylaminomethyl)-5,6,7,8-tetrahydro-1-naphthol

This compound was made in substantially the same manner as described in Example 1 by substituting 2-tert.-butyl-5,6,7,8-tetrahydro-1-naphthol for 6-tert.-butyl-2,3-dimethylphenol. After crystallization from acetonitrile the desired compound was obtained as white crystals melting at 95° to 105° with decomposition.

EXAMPLE 4

2,4,6-tris(5-tert.-butyl-2,3-dimethyl-4-hydroxybenzyl-)isocyanurate 3.87 grams of isocyanuric acid and 32.3 grams of 6-tert.-butyl-2,3-dimethyl-4-(dimethylaminomethyl)-phenol was dispersed in 100 ml of dimethylformamide and heated together at 95° to 106° for 11 hours, at 130° to 135° for 2 hours and then at 145° to 150° for 2 ½ hours. The reaction mixture was then poured into about 500 ml of an ice-water mixture and extracted with benzene, the benzene extract being washed successively with water, 6N hydrochloric acid and water again and then dried over anhydrous sodium sulfate. After removal of the benzene by distillation at reduced pressure, the residue was triturated with hot hexane and successively crystallized from aqueous isopropanol and benzene yielding white crystals melting at 193° to 195° (Compound 1). 2,4,6-tris(2-tert.-butyl-4-hydroxy-5,6,7,8-tetrahydro-1-naphthyl) isocyanurate is made by the method of Example 4 by substituting the compound of Example 3 for 6-tert.-butyl-2,3-dimethyl-(4-dimethylaminomethyl)-phenol.

EXAMPLE 5

2,4,6-tris{5-(1,1,3,3-tetramethylbutyl)-2,3-dimethyl-4-hydroxybenzyl)isocyanurate}

A mixture of 3.87 grams of cyanuric acid and 27.6 grams of 6-tert.-octyl-2,3-dimethyl(4-dimethylaminomethyl)phenol in 120 ml dimethylformamide were heated together at 95° to 100° for 18 hours, at 120° to 125° for 6 hours and then at 135° for 16 hours. The reaction mixture was concentrated by distilling off about 80 ml of dimethylformamide, the residue then being poured into cold water and extracted several times with toluene. The toluene extract was washed with water, 6N hydrochloric acid, clarified and washed further with 2N sodium hydroxide and with water again until the wash water was neutral, the toluene solution being dried over anhydrous sodium sulfate. The toluene was removed by distillation at reduced pressure and the residue, 24.3 grams, triturated with boiling hexane yielding a white solid (20 grams) Thin layer chromatography indicated that the above white solid consisted of two products. Elution chromatography of 19 grams of the white solid using silica gel and first benzene (about 4.4 liters) and then 500 ml of chloroform as eluting solvents yielded 13 grams of the product of this example. After trituration with hot hexane, and crystallization from a solvent mixture of hexanebenzene the product was obtained as white crystals melting at 152° to 161° (Compound 2).

EXAMPLE 6

2,4-bis{5-(1,1,3,3-tetramethylbutyl)-2,3-dimethyl-4-hydroxybenzyl)isocyanurate}

The elution chromatography of Example 5 was continued using 1400 ml of methanol as solvent yielding, after evaporation of a solvent, 5.8 grams of product which was mainly the compound of this example and was obtained as off-white crystals melting at 206° to 209° after crystallization from acetonitrile (Compound 3).

Unstabilized polypropylene powder (Hercules Profax 6501) was thoroughly blended with 0,2% by weight of the indicated stabilizer compound. Also prepared were samples of polypropylene containing 0.1% by weight of the same stabilizer and 0.3% by weight of DSTDP (distearyl-β-thiodipropionate). The blended materials were than milled on a two-roll mill at 182°C for 10 minutes, after which time the stabilized polypropylene was sheeted from the mill and allowed to cool.

The milled polypropylene sheets were then cut into pieces and pressed for 7 minutes on a hydraulic press at 218° C, 2,000 pounds per square inch pressure. The resulting plaques of 25 mil thickness were tested for resistance to accelerated aging in a forced draft oven at 150° C. When the plaques showed the first signs of decomposition (e.g., cracking or brown edges) they are considered to have failed. The results are shown in Table V below.

TABLE V

Oven Aging of Polypropylene Containing 2,4,6-tris(2,3,5-trialkyl-4-hydroxybenzyl)isocyanurates

| Ex. No. | Percent Stabilizer | Hours to Failure |
|---|---|---|
| 7 | Unstabilized | 3 |
| 8 | 0.2% Compound 1 | 120 |
| 9 | 0.1% Compound 1 + 0.3% DSTDP | 2035 |
| 10 | 0.2% Compound 2 | 50 |
| 11 | 0.1% Compound 2 + 0.3% DSTDP | 1835 |
| 12 | 0.2% Compound 3 | 25 |
| 13 | 0.1% Compound 3 + 0.3% DSTDP | 1215 |

Correspondingly good stabilization is achieved at concentrations of 0.01 to 2%.

EXAMPLE 14

Pellets (500 g) of unstabilized nylon-6,6 (Zytel 101, DuPont) are placed in a Kitchen Aid Mixer. With mixing, a solution of 0.5% (based on the weight of nylon) of 2,4,6-tris(5-tert.-butyl-2,3-dimethyl-4-hydroxybenzyl-)isocyanurate in 20 ml of methylene chloride is added slowly. Sodium hypophosphite (0.5 gm 0.1%) is dissolved in 20 ml of water and added slowly with mixing to the nylon pellets after the antioxidant solution has been added and most of the methylene chloride has evaporated. The stabilized pellets are dried at 80° C at <<1 mm Hg. for 4 hours.

The polyamide formulation is extruded at 600° F through a ¼ inch die into a rod which is water cooled and chopped into pellets. A ¾ inch Brabender extruder, equipped with a nylon screw, is used. The pellets are dried at 180° C at <1mm for 4 hours.

The dried pellets are reextruded into 5 mil (nominal) monofilament fiber which is subsequently oriented (4:1). The oriented fibers are exposed to outdoor weathering (direct and under glass) and tensile measurement is made periodically. The sample is considered to have failed when it loses 50% of its original tenacity. The sample stabilized with the above noted product retains tensile strength for a much longer period than the unstabilized sample.

EXAMPLE 15

Unstabilized high impact polystyrene resin is dry blended with 0.01% by weight of the resin of 2,4,6-tris(2-tert.-butyl-4-hydroxy-5,6,7,8-tetrahydro-1-naphthyl) isocyanurate. The resin is then extrusion compounded on a 1 inch 24/1=L/D extruder, melt temperature 500° F and pressed for 7 minutes at a temperature of 163° C and a pressure of 2000 psi into a sheet of uniform thickness of 100 mil. The sheets are then cut into plaques of 2 inch × 2 inch. The plaques are then exposed in a FS/BL exposure device and color measurements made periodically using a Hunter Color Difference Meter Model D25. The polystyrene samples stabilized with the above product developed the undesirable yellow discoloration substantially later after such discoloration occured in the unstabilized samples.

EXAMPLE 16

Unstabilized linear polyethylene is solvent blended in methylene chloride with 0.5% by weight of the substrate of 2,4,6-tris(5-tert.-butyl-2,3-dimethyl-4-hydroxybenzyl-α-methyl)isocyanurate and then vacuum dried. The resin is then extruded at 450° F as described in Example 15. Thereafter, the test procedure of Example 15 is followed and the light stability of the samples determined. Polyethylene stabilized with the above product is found to be much more stable than the unstabilized polyethylene or the polyethylene stabilized only with an antioxidant.

EXAMPLE 17

A quantity of SBR emulsion containing 100 g of rubber (500 ml of 20% SBR obtained from Texas U.S., Synpol 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (<1 mm) at 40° to 45° C.

The dried rubber (25 g) is heated under nitrogen at 125° C in a Brabender mixer and to this is added with mixing 0.1% of 2,4,6-tris(3,5-dicyclohexyl-4-hydroxy-2-methylbenzyl)isocyanurate.

EXAMPLE 18

To 50 g of polyacetal resin containing 0.1% of an acid scavenger, dicyandiamide, is added 0.2% by weight of 2,4-bis{5-(1,1,3,3-tetramethylbutyl)-2,3-dimethyl-4-hydroxybenzyl} isocyanurate, and milled for 7 minutes at 200° C in a Brabender Plastic-recorder. The milled formulation is subsequently pressed into a 40 mil sheet at 215° C at 350 psi for 90 seconds then cooled quickly in a cold press at 350 psi. The stabilized sheets are then remolded for 2 minutes at contact pressure and for 3 minutes at 300 psi at 215° to give plaques 1 ½ inch × 2 ¼ inch × 125 mil. Thereafter, the testing procedure of Example 16 is followed to determine the light stability of the sample. The stabilized samples are found to be much more stable than the unstabilized samples.

EXAMPLE 19

Unstabilized thoroughly dried polyethylene terephthalate chips are dry blended with 1.0% of 2,4,6-tris(3,5-diisopropyl-4-hydroxy-2-ethylbenzyl) isocyanurate. 60/10 denier multifilament is melt spun at a melt temperature of 290° C. The oriented fiber is wound on white cards and exposed in a Xenon Arc Fadeometer. Color measurements are made periodically with a Hunter Color Difference Meter Model D25. The stabilized samples are found to be much more light stable than the unstablized samples.

EXAMPLE 20

A stabilized high temperature lubricating oil is prepared by incorporating 0.05% by weight of 2,4,6-tris(2,3,5-trimethyl-4-hydroxybenzyl) isocyanurate to the lubricant which comprises diisoamyladipate. The stabilized composition is compared with the unstabilized lubricant by heating at 175° C in the presence of air and metallic catalysts according to the test method described in Military Specification Mil-I-7808c. After 72 hours, the blank containing no stabilizer contains more sludge and has a greater viscosity than the stabilized lubricant.

What is claimed is:

1. The compound 2,4,6-tris(5-tert.-butyl-2,3-dimethyl-4-hydroxybenzyl) isocyanurate.

2. The compound 2,4,6-tris{(5-(1,1,3,3-tetramethylbutyl)-2,3-dimethyl-4-hydroxybenzyl) isocyanurate.}.

* * * * *